(12) United States Patent
Kostopoulos et al.

(10) Patent No.: US 11,330,491 B2
(45) Date of Patent: May 10, 2022

(54) METHOD FOR HANDING OVER A CALL FROM A FIRST COMMUNICATION NETWORK TO A SECOND COMMUNICATION NETWORK AND COMMUNICATION SYSTEM

(71) Applicant: UNIFY PATENTE GMBH & CO. KG, Munich (DE)

(72) Inventors: Nikolaos Kostopoulos, Athens (GR); Adamantia-Eleni Stamelaki, Ilioupolis (GR)

(73) Assignee: UNIFY PATENTE GMBH & CO. KG, Munich (DE)

( * ) Notice: Subject to any disclaimer, the term of this patent is extended or adjusted under 35 U.S.C. 154(b) by 0 days.

(21) Appl. No.: 17/425,301

(22) PCT Filed: Jan. 23, 2019

(86) PCT No.: PCT/EP2019/051652
§ 371 (c)(1),
(2) Date: Jul. 22, 2021

(87) PCT Pub. No.: WO2020/151820
PCT Pub. Date: Jul. 30, 2020

(65) Prior Publication Data
US 2022/0086717 A1 Mar. 17, 2022

(51) Int. Cl.
*H04W 36/08* (2009.01)
*H04W 60/04* (2009.01)
(Continued)

(52) U.S. Cl.
CPC ......... *H04W 36/08* (2013.01); *H04L 65/1006* (2013.01); *H04L 65/1053* (2013.01); *H04L 65/1069* (2013.01); *H04W 60/04* (2013.01)

(58) Field of Classification Search
CPC .. H04W 36/08; H04W 60/04; H04L 65/1006; H04L 65/1053; H04L 65/1069
See application file for complete search history.

(56) References Cited

U.S. PATENT DOCUMENTS 9,432,239 B2 8/2016 Olson et al.
2004/0203855 A1\* 10/2004 Veerasamy ........... H04W 16/18
455/456.1
(Continued)

FOREIGN PATENT DOCUMENTS

EP 2330837 A1 6/2011

OTHER PUBLICATIONS

International Search Report and Written Opinion issued in PCT/EP2019/051652, dated Aug. 13, 2019 (13 pages).
(Continued)

*Primary Examiner* — Khaled M Kassim
(74) *Attorney, Agent, or Firm* — Arc IP Law, PC; Joseph J. Mayo

(57) ABSTRACT

A method for handing over a call from a first communication network to a second communication network, comprising the steps of: registering, by a first mobile client, in particular, an IP-PBX VoIP client, running on a mobile device, the mobile device with an IP-based PBX for the first communication network, following a naming convention, by sending a registration message from the first mobile client to the IP-based PBX, the registration message comprising an endpoint ID, establishing an active conversation over the first communication network, detecting, on the mobile device, a connectivity change with respect to the first communication network, wherein the further steps of retrieving, by the first mobile client, the status of the call impacted by the connectivity change, and subsequently transferring the call to the second communication network are carried out using SIP
(Continued)

NOTIFY messages. Further, a communication system for carrying out the method is provided.

16 Claims, 2 Drawing Sheets

(51) Int. Cl.
    *H04L 65/1053*     (2022.01)
    *H04L 65/1069*     (2022.01)
    *H04L 65/10*     (2022.01)

(56) References Cited

U.S. PATENT DOCUMENTS

| | | | | |
|---|---|---|---|---|
| 2009/0257361 | A1* | 10/2009 | Deshpande | H04L 43/50 370/252 |
| 2010/0202465 | A1* | 8/2010 | Sakata | H04L 45/00 370/400 |
| 2010/0323687 | A1* | 12/2010 | Richter | H04W 24/04 455/424 |
| 2013/0064106 | A1* | 3/2013 | Sylvain | H04W 24/08 370/252 |
| 2013/0329567 | A1* | 12/2013 | Mathias | H04W 36/305 370/242 |
| 2016/0066221 | A1 | 3/2016 | Sapkota et al. | |
| 2016/0234749 | A1* | 8/2016 | Singh | H04W 36/0022 |
| 2016/0337932 | A1* | 11/2016 | Ji | H04W 36/14 |
| 2016/0374132 | A1* | 12/2016 | Yerrabommanahalli | H04L 65/1073 |
| 2018/0270346 | A1* | 9/2018 | Donnenwirth | H04M 15/60 |
| 2018/0302334 | A1* | 10/2018 | Osterlund | H04L 43/50 |
| 2020/0374979 | A1* | 11/2020 | Rice | H04B 17/318 |
| 2021/0068019 | A1* | 3/2021 | Cuevas Ramirez | H04L 65/1016 |
| 2021/0168187 | A1* | 6/2021 | Krovvidi | H04L 65/80 |

OTHER PUBLICATIONS

International Preliminary Report on Patentability and Written Opinion issued in PCT/EP2019/051652, dated Jul. 27, 2021 (7 pages).

* cited by examiner

METHOD FOR HANDING OVER A CALL FROM A FIRST COMMUNICATION NETWORK TO A SECOND COMMUNICATION NETWORK AND COMMUNICATION SYSTEM

BACKGROUND

Field of the Invention

The field of the invention is the field of network communication and switching. More particularly, but not by way of limitation, one or more embodiments of the invention enable a method for handing over a call from a first communication network to a second communication network and a corresponding communication system.

Description of the Related Art

Today, mobile phones are commonly used, and cellular telecommunications are widespread. There is a large variety of providers which offer mobile communication services in a plurality of different mobile communication networks.

If a user of a mobile device has an active conversation, for example, with a Session Initiation Protocol (SIP) client running on his/her mobile device and the connectivity of the device changes, for example, from Wi-Fi to Cellular/Long Term Evolution (LTE) Network or vice versa, the speech path may be lost, and consequently the conversation is terminated.

In prior art, there are methods known for switching an ongoing call from one communication network to another one, for example, when the connectivity degrades. This process is called handover or handoff. There exists a plurality of problems with respect to the known methods concerning a seamless handover procedure which is desirable.

For example, in a scenario in which a SIP client is registered on an Internet Protocol Private Branch Exchange (IP PBX) that can support Computer Supported Telecommunications Application (CSTA) over SIP, multiple registrations for the same user account are supported and the SIP client supports Voice over Internet Protocol (VoIP) over Cellular/LTE. A user with the SIP VoIP client running on his/her mobile device may then connect to a Wi-Fi hotspot, and has allocated an Internet Protocol (IP) address. The SIP client registers to the IP PBX with this IP address. Then the user moves out of Wi-Fi hotspot range. The connection with the Wi-Fi is lost, consequently the original IP address.

If the user had a conversation established when the Wi-Fi was lost, the speech path is lost as well, because the Wi-Fi IP is not reachable. If the Operating System (OS) of the mobile device detects a Cellular/LTE network available, a connection is established with this network, a new IP is assigned to the mobile device, and the SIP client registers to the PBX with this cellular network IP address.

This process does require a certain period of time to complete the registration and move the call from the Wi-Fi to the Cellular/LTE network, however it does not ask for IP network traversal, the support of Session Traversal Utilities for NAT (STUN), Traversal Using Relays around NAT (TURN), and Interactive Connectivity Establishment (ICE) protocols.

Therefore, an object of embodiments of the invention is to provide a method for seamless handing over a call from a first communication network to a second communication network and corresponding communication system. This object is solved by the method according to claim 1; illustrative embodiments of the invention are defined in the respective dependent claims.

BRIEF SUMMARY OF THE INVENTION

Accordingly, a method for handing over a call from a first communication network to a second communication network is provided, wherein the method comprises the steps of registering, by a first mobile client, in particular, an IP-PBX VoIP client, running on a first mobile device, the first mobile device with an IP-based PBX for the first communication network, following a naming convention, by sending a registration message from the first mobile client to the IP-based PBX, the registration message comprising an endpoint ID epid, establishing an active conversation over the first communication network, detecting, on the first mobile device, a connectivity change with respect to the first communication network, wherein the further method steps of retrieving, by the first mobile client, the status of the call impacted by the connectivity change, and subsequently transferring the call to the second communication network are carried out using SIP NOTIFY messages.

According to one or more embodiments, the IP-based PBX arranged in an e.g. OpenScape Voice Enterprise solution architecture.

According to one or more embodiments, the method further includes an endpoint ID generation step, wherein the endpoint ID comprises a unique identifier part and a network identifier part, in particular, a 1-digit identifier part, indicating the network connectivity.

The endpoint ID generation step comprises generating at least a first endpoint ID indicative for the first communication network, and a second endpoint ID indicative for the second communication network.

According to one or more embodiments, a first digit is used for a first network connectivity and a second digit different from the first digit is used for a second network connectivity.

One or more embodiments provide for the endpoint ID being included in the "from" header of the registration message The step of detecting a connectivity change may be carried out by an operating system installed on the first mobile device which transmits the information on connectivity change to the first mobile client The first mobile client may query for active calls on the first mobile device using CSTA Snapshot_Device and CSTA Snapshot_Call requests.

The first mobile client may receive a SnapshotCall response containing active calls on the corresponding endpoints.

It is also advantageous, if the first mobile client checks the device unique identifier part of the SIP endpoint ID of the call and the currently registered one, and if they match, then the first mobile client sends a CSTA Single Step Transfer for transferring the call from the first communication network to the second communication network using the endpointID related to the new network connectivity.

Moreover, in one or more embodiments, a SIP INVITE: Auto Answer message is used for handover from the first communication network to the second communication network.

The first mobile client may be a SIP client.
The IP-based PBX may be a SIP-based PBX.

The first and second communication networks or either one of them may be wireless networks/a wireless network, or mobile networks/a mobile network.

Further, according one or more embodiments of the invention, a communication system is provided, comprising at least one first mobile device on which a first mobile client is running, and an IP-based PBX arranged in an e.g. OpenScape Voice Enterprise solution architecture, the communication system being adapted to handover an active call of the at least one first mobile device from a first communication network to a second communication network upon detection of a connectivity change using the method according to any one of the preceding claims.

By the inventive method and communication system, a seamless handover is enabled without any time delays or connectivity loss. Namely, when a network connectivity change occurs, for example, from Wi-Fi to Cellular/LTE Network or vice versa, the conversation is restored after some seconds without the need for support of STUN, TURN, ICE protocols for IP network traversal. Rather, this is accomplished simply by means of SIP and CSTA over SIP control signalling.

Depending on the capabilities of the SIP client and IP PBX, answering the call therefore the restoration of the speech path may be carried out automatically or by human intervention, namely, by the user or person answering the call.

It is noted that the approach outlined above may be applied for SIP clients running on mobile operating systems that are able to detect the connectivity change and pass this information to the SIP client.

BRIEF DESCRIPTION OF THE DRAWINGS

Illustrative embodiments of the invention thereof will be described below in further detail in connection with the drawing.

DETAILED DESCRIPTION OF THE INVENTION

Figure 1:
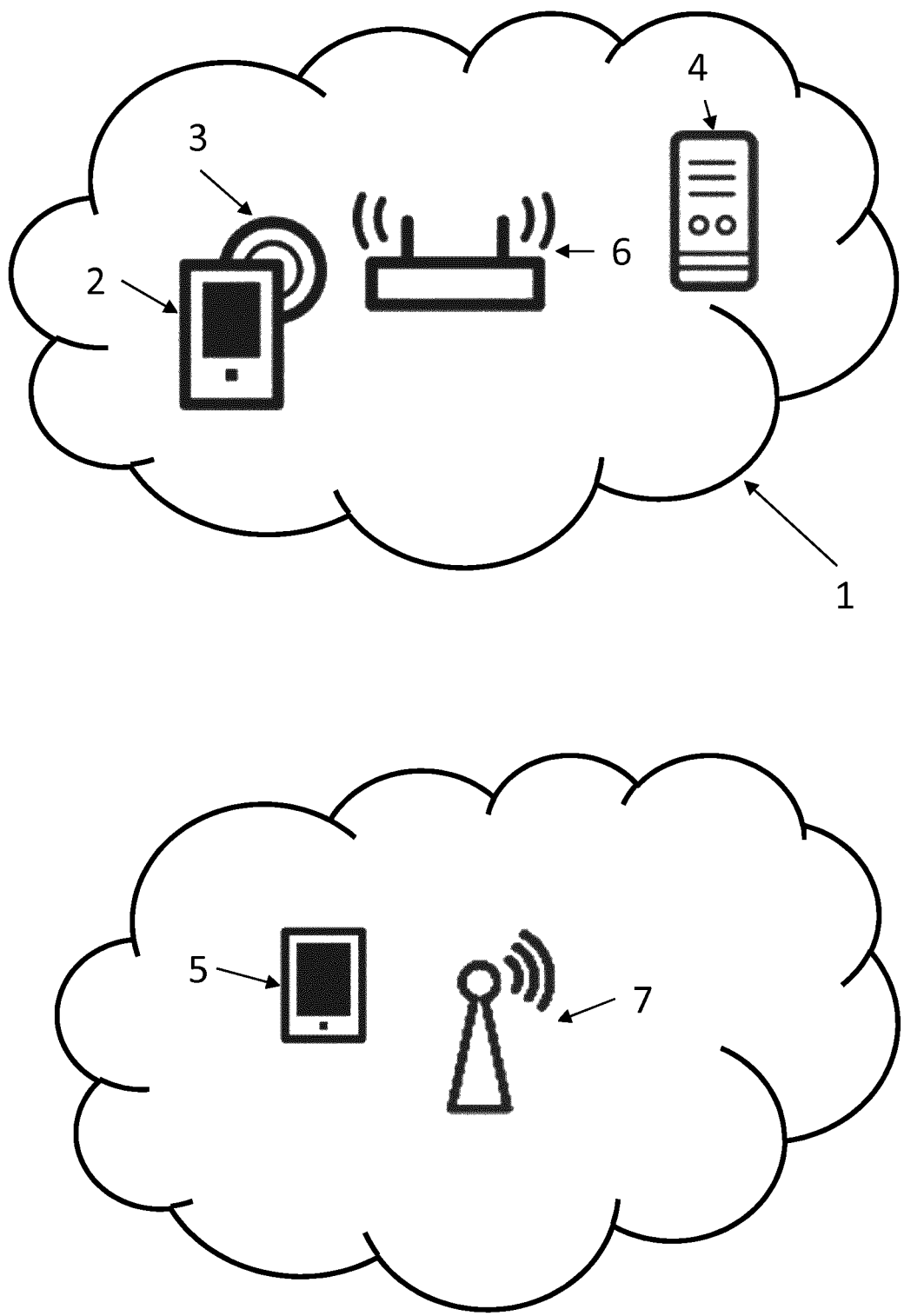
FIG. 1 schematically illustrates an embodiment of a communication system for carrying out the method for handing over a call from a first communication network to a second communication network.

FIG. 1 shows an embodiment of a communication system 1 comprising first mobile device 2 on which a first mobile client 3 is running, and a SIP-based PBX 4 arranged in an IP/SIP PBX architecture, e.g. OpenScape Voice Enterprise. The communication system 1 is adapted to handover an active call made from the first mobile device 2 to a second mobile device 5 in a seamless manner. At first, the first mobile device 2 is using a first communication network 6, for example, a Wi-Fi network. During the call, when a connectivity problem occurs in the first communication network 6, the first mobile client 3 is responding to the lack of signal by initiating a handover sequence as it is connected to the second communication network 7, for example, a cellular network.

In the following, the basic aspects of the handoff procedure according to an embodiment are provided.

As to the registration procedure or registration step, the following is explained. When a SIP client, namely, the first mobile client 3, registers with an IP PBX 4, the registration message contains a SIP Endpoint Id. The SIP endpoint ID identifies the physical device that the SIP client is running on, for example, a mobile phone as the first mobile device 2.

It is noted that in prior art, the SIP endpoint ID generation for a client running on a mobile device is independent from the network connectivity mode. It is a string consisting of a unique device identifier part, which is generated based on the device MAC Address or mobile vendor unique device identifier, namely:

epid=<device-unique-identifier-part>

According to an embodiment of the method for handing over a call from a first communication network 6 to a second communication network 7, the SIP endpoint ID generation algorithm is made dependable on the network connectivity mode. Namely, the SIP endpoint ID is consisting of a unique identifier part and a network identifier part (1-digit), which indicates the Wi-Fi or cellular/LTE connectivity:

<device-unique-identifier-part>+<network-identifier-type-part>

According to an embodiment, a convention here may be the use of the letter "g" for cellular connectivity, whereas the letter "i" is used for Wi-Fi connectivity.

The SIP endpoint ID is included in the "From" header, as in the following SIP REGISTER message. Thus, an example for a SIP endpoint ID (epid) would be:

epid=sc1913Eg for cellular/LTE connectivity
epid=sc1913Ei for Wi-Fi connectivity The simultaneous registration of the same user with two different SIP endpoint Ids allows the transfer of the call from one SIP endpoint to the other, via a CSTA over SIP request (SingleStepTransfer request).

This idea can easily be expanded so that the SIP endpoint generation algorithm takes into consideration the SSID name of the Wi-Fi network so that the restoration of the speech path is possible in a case of a connectivity change from any mobile communication network to another for example:

Cellular/LTE, as a first mobile communication network 6) to Wi-Fi, as a second communication network 7) or
Wi-Fi, as a first mobile communication network 6) to another Wi-Fi, as a second communication network 7).

The OS also provides the SSID of the Wi-Fi network that is connected in the event of a network change event. The SIP client (first mobile client 3) has to maintain the SSID of the current connected Wi-Fi (first mobile communication network 6) and the one received in the network changed event (second communication network 7) in its memory. Further, the SIP client keeps the last connected Wi-Fi SSID and BSSID and the indication of network identifier part in its memory.

In the initial generation of Wi-Fi Associated SIP endpoint ID the "i" network identifier part indication is used.

epid=sc1913Ei for first mobile communication network 6 connectivity

If the mobile device 3 is connected to a different Wi-Fi network, the indication "w" is used for the generation of the SIP endpoint ID and the SSID and BSSID of the new Wi-Fi network are kept in the memory as the current Wi-Fi connection.

epid=sc1913Ew for second communication network 7 connectivity

On every change of Wi-Fi connection, the indications "i" and "w" are used in an alternating manner, thus, providing the capability to handover the call from one Wi-Fi related SIP endpoint ID (epid) to the other Wi-Fi related SIP endpoint ID (epid).

This simple logic has the advantage that the required storage space in the SIP client is very small. The number of the simultaneously registered SIP endpoint Ids may be limited to a maximum of 3 for the same user device.

The following further example is given for illustrating the procedure according to an embodiment of the method for handing over a call from a first communication network to a second communication network. In this example, user A (as a user of the first mobile device 2) is a user of an IP PBX 4 and user A uses his/her SIP client (the first mobile client 3) running on his/her mobile device while it is connected to the IP PBX via a Wi-Fi network. User A participates in an active conversation with user B using a second mobile device 5. The IP address that has been obtained from the Wi-Fi network and the SIP Endpoint ID, which is generated using the Wi-Fi indication and the unique device identifier, which have been used for the registration step.

While the user moves with his mobile device 2 out of the Wi-Fi network coverage, the signals (IP/signaling/voice) from the Wi-Fi network are lost for user A. The partner of the conversation, namely, the user B using the second mobile device 5 who is the recipient of the call, hears silence for some seconds, while from the IP PBX point of view, the call is still active.

The operating system of the first mobile device 2 of user A detects the loss of the Wi-Fi connectivity and informs the SIP client (first mobile client 3) accordingly. If there is a cellular network available, the OS of the first mobile device 2 informs the SIP client 3 that there is a new connection available with a new IP.

The SIP client 3 running on the mobile device 2 of user A tries to register again with the PBX 4 using the IP address that has been obtained from cellular network and the SIP endpoint ID that has been generated from the unique identifier and the cellular network indication. As soon as the registration over the cellular network is complete for user A, the SIP client 3 asks for the current active calls concerning this user via CSTA Snapshot_Device and CSTA Snapshot_Call requests, which are sent over SIP (CSTAoSIP), for this specific user.

The SnapshotCallResponse contains the active calls on the corresponding endpoints. In this embodiment, it contains one call on the SIP endpoint ID that was previously associated to the Wi-Fi network. The SIP client 3 checks the device unique identifier part of the SIP endpoint ID of the call and the currently registered one. If they are found to be the same, then a CSTA SingleStepTransfer is sent to the PBX 4. Thereby, the call is transferred from the Wi-Fi related SIP endpoint ID to the Cellular/LTE related endpoint ID (same device, namely, first mobile device 2, same user, namely, user A in the example). When the PBX 4 and SIP client 3 have the capability to auto-answer the call, the call is answered automatically by the SIP client 3.

The whole procedure only lasts a few seconds (for example, 4 to 8 seconds), this time period including the detection of the Wi-Fi connection loss at OS level and the establishment of the cellular network connectivity. At this time, the re-registration phase usually takes 2 to 3 seconds, and the SingleStepTransfer request cycle usually lasts 2 to 3 seconds.

Figure 2:
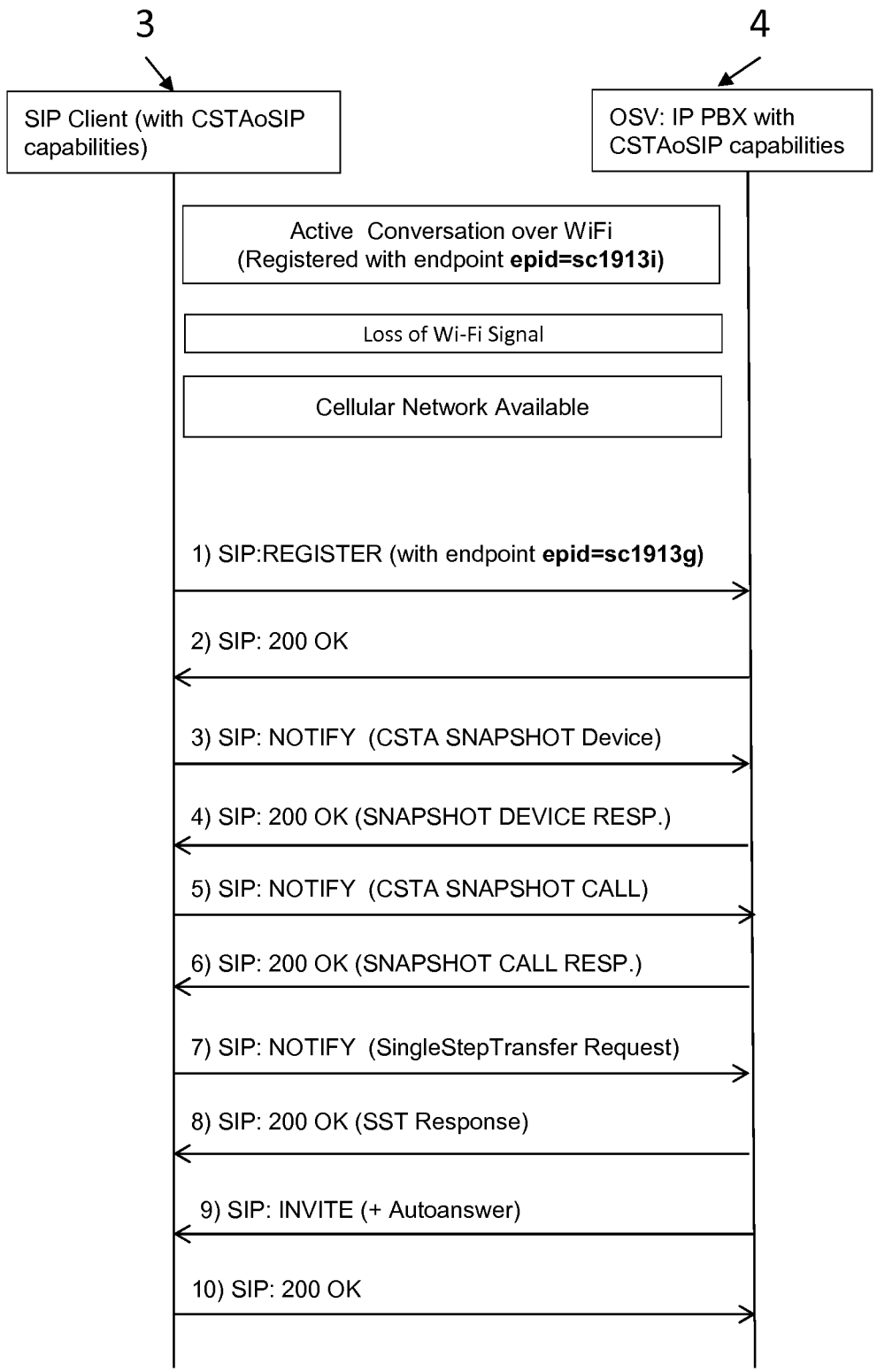
FIG. 2 schematically illustrates a signaling message exchange flow according to an embodiment of the invention.

FIG. 2 schematically shows a SIP/CSTA signaling call flow for a network change from a Wi-Fi network to the cellular network, which is triggered in response to a connection loss to the Wi-Fi network and a new connection established to the cellular network.

In the example shown here, on the left side, there is the SIP client or first mobile client 3 as shown in FIG. 1, and on the right side, there is the IP-based PBX 4, also shown in FIG. 1.

The conditions for triggering an automatic handover are as follows, when executing a transition from a first network 6 (see FIG. 1) to a second network 7 (see FIG. 1). The SIP client (for example, the first mobile client 3) subscribes for network change events to the OS (e.g. iOS, Android) of the device (for example, the first mobile device 2). When a network change event arrives, the SIP client retrieves the new IP and SIP registers over the new network (for example, the second network 7), which triggers the Snapshot requests and subsequently, the Auto-Handover request.

Currently, in mobile operating systems, Wi-Fi has priority over cellular connection, and thus, whenever Wi-Fi connectivity is detected, the re-registration, snapshot and automatic handover are triggered. However, in one or more embodiments of the invention, it is enabled that the mobile operating systems provide the capability to route IP traffic via a specific channel when both Wi-Fi and cellular connections are available, the only condition that would trigger the Auto-Handover would be the loss of the current connectivity mode.

However, it is noted that the detection of a low Wi-Fi signal doesn't lead to Auto-Handover. In case of detecting a low signal connection, a popup notification suggests to the user that he/she can manually disable/turn off the Wi-Fi and connect via cellular if the cellular data option is enabled on the device, so that the whole process takes over.

In the following, a detailed description of the signaling call flow on a network change from Wi-Fi to cellular network is given. In particular, the flow shown in FIG. 2 illustrates what happens after the call establishment when user A is registered over Wi-Fi. It is a flow that may be supported from a SIP IP PBX 4 and a SIP Client 3 and allows the handover from one SIP endpoint ID to another endpoint of the same user/directory number.

With respect to the call establishment over Wi-Fi it is noted that at this point, the SIP client (for example, the first mobile client 3 shown in FIG. 1) is registered with the Wi-Fi endpoint ID (sc1913Ei) and via the normal call establishment procedure, and there is an active call in talk state.

The OS of the first mobile client 2 (see FIG. 1) detects the loss of Wi-Fi connectivity and the existence of cellular connectivity and informs the SIP client (first mobile client 3). The call is preserved as an active call from the IP PBX perspective. For example, the call may be preserved for at least 30 seconds after the loss of the SIP client's connectivity, a time period that will not affect the Auto-Handover functionality.

As soon as SIP client (first mobile client 3) is informed about the connectivity change, the re-registration procedure starts:

1) Register from cellular network: With the obtained IP from the cellular network, the SIP client registers with the PBX with the cellular-related SIP endpoint ID (sc1913Eg), whereby the SIP Client should include the epid in the 'from' header REGISTER sip:ipPBX
   Via:
   Route: <sip:ipPBX;lr>
   Max-Forwards: 70
   From: <sip:userA@ipPBX:portPBX>;epid=sc1913Eg
   To: <sip:userA@ipPBX>
   Call-ID:
   CSeq: . . . REGISTER Allow:
Allow-Events:
Authorization:
Contact: <sip:userA@ipCellular;transport=tls>; expires= . . . ;audio
Supported:
Content-Length:

2) The PBX confirms the registration request with 200 OK, containing the SIP endpoint ID in the contact header:
SIP/2.0 200 OK
From: <sip:userA@ipPBX:portPBX>; tag=; epid=sc1913Eg
To: <sip:userA@ipPBX:portPBX>
CSeq: . . . REGISTER
Via: SIP/2.0/TLS . . . ;branch= . . . ;rport
Call-ID:
Date:
Contact: <sip:userA@ipCellular:portCellular;transport=tls>;expires=;epid=sc1913Eg
Authentication-Info:
Server:
Supported:
Content-Length:

3) SIP Client 3 asks the PBX 4 whether there are active calls for the user A via CSTA over SIP message NOTIFY (Snapshot Device Request).
NOTIFY sip:userA@ipPBX:portPBX SIP/2.0
Via: SIP/2.0/TLS
Route:
Max-Forwards: 70
From: <sip:user@ipPBX:portPBX>;
To: <sip:userA@ipPBX:portPBX>
Call-ID:
CSeq: . . . NOTIFY
Allow:
Allow-Events: refer
Contact: <sip:userA@ipCellular:portCellular;transport=tls>
Event:
Supported:
User-Agent:
Content-Type:
Content-Length: 93
<SDe><sO>user_Adevice_id</sO><extn><pDa></prvt></pDa></extn></SDe>

4) The PBX 4 replies with NOTIFY (Snapshot Device Response) containing the Call-ID of the active call on this user according to the ECMA standard.
NOTIFY (Snapshot Device Response)
SIP/2.0 200 OK
Via:
To: <sip:userA@ipPBX:portPBX>
From: <sip:userA@ipPBX:portPBX>;tag=
Call-ID:
CSeq: . . . NOTIFY
Content-Type: application/csta+xml
Content-Length:
<SnDR><cRlD><sDa><sDRl><clr><clD>call_id_1</clD><dlD>N<
userA_device_id</dlD></clr><eD><dlr>userA_device_id . . . SnDR>

5) The SIP client 3 requests with NOTIFY (Snapshot Call Request) data for the active call for the Call-ID received in Snapshot Device Response.
NOTIFY sip:userA@ipPBX:portPBX SIP/2.0
Via: SIP/2.0/TLS
Route:
Max-Forwards: 70
From: <sip:userA@ipPBX:portPBX>;tag=45122c86e6
To: <sip: userA@ipPBX:portPBX>
Call-ID:
CSeq: . . . NOTIFY
Allow:
Allow-Events:
Contact: <sip:userA@ipCellular:portCellular;transport=tls>
Event:
Supported:
User-Agent:
Content-Type: application/csta+xml
Content-Length: 110
<SC><sO><clD>call_id_1</clD><dlD>userA_device_id</dlD></sO></SC>

6) The PBX 4 replies with 200 OK (Snapshot Call Response). The SIP epid (of the first client 3) which has the active call is contained in the SnapshotCallResponse: sc31913Ei (unique identifier part "sc1913E" and Wi-Fi indication "i")
In the case of OSV acting as an IP PBX, this information is included in the PrivateData:
SIP/2.0 200 OK
Via:
To: <sip:userA@ipPBX:portPBX>
From: <sip:userA@ipPBX:portPBX>;tag=45122c86e6
Call-ID:
CSeq: . . . NOTIFY
Content-Type: application/csta+xml
Content-Length:
<SCR><cRlD><sDa><sCRlo><dOC><dlr>userA_device_id
</dlr></dOC><cl><clD>call_id_1</clD><dlD>userA_device_id</dlD> . . .
<pDa><prvt><zEpid>sc1913Ei</zEpid></prvt></pDa></extn></SCR>
<extensions>
<privateData>
<private xmlns:scx="http://www.siemens.com/schema/csta">
<private>
<zEpid>sc1913Ei</zEpid>
</private>
</privateData>
</extensions> . . .

7) The SIP client (first mobile client 3) identifies that there is an active call on the Wi-Fi related SIP endpoint ID (by comparing the unique identifier part of the SIP endpoint ID that has been received in the SnapshotCall response and the current SIP endpoint ID) and requests the handover of the call with NOTIFY SingleStepTransfer request. The request contains the destination SIP endpoint ID (epid). The SIP epid can be added as part of transferredTo as shown below. An Auto-Answer indication can be added in the request in the private data section.
NOTIFY sip:userA@ipPBX:portPBX
Via:
Route:
Max-Forwards:
From: <sip:userA@ipPBX:portPBX>;tag=85440bb075
To: <sip:userA@ipPBX:portPBX>
Call-ID:
CSeq: . . . NOTIFY
Allow:
Allow-Events:
Contact: <sip:userA@ipCellular: portCellular;transport=tls>

Event:
Supported:
User-Agent:
Content-Type: application/csta+xml
Content-Length:
<SSTC><atC><clD>call_id_1</clD><dlD>userA_device_id</dlD></atC>
<tTo>userA_device_id;epid=sc1913Eg</tTo><extn><pDa><prvt><ztTgt>Auto-Answer</ztTgt></prvt></pDa></extn></SSTC>
<transferredTo>userA_device_id;epid=sc1913Eg</transferredTo>
<extensions>
  <privateData>
    <private>
      <transferTarget>Auto-Answer</transferTarget>
    </private>
  </privateData>
</extensions>

8) The PBX 4 acknowledges the request providing the new called Id of the transferred call as it foreseen by the ECMA standard (call_id_2):
SIP/2.0 200 OK
Via:
To: <sip:userA@ipPBX:portPBX>
From: <sip:userA@ipPBX:portPBX>;tag=85440bb075
Call-ID:
CSeq: . . . NOTIFY
Content-Type: application/csta+xml
Content-Length:
<SSTCe><trC><clD>call_id_2</clD><dlD>userA_device_id</dlD></trC><extn><pDa><prvt><zseHo>true</zseHo></prvt></pDa></extn></SSTCe>
<SingleStepTransferCallResponse>
  <transferredCall>
    <callID>call_id_2</callID>
    <deviceID>userA_device_id</deviceID>
  </transferredCall>
</SingleStepTransferCallResponse>

9) The INVITE is sent to the SIP client 3 with the cellular IP address. If the SIP client 3 and the IP PBX 4 support Auto-answer the corresponding indication exists in the INVITE.
Alert-Info:info=alert-autoanswer; delay=0
INVITE sip:userA@ipCellular:portCellular;transport=tls SIP/2.0
Via:
Max-Forwards:
Contact: <sip:userB@ipPBX;transport=tls>
To: <sip:userA@ipCellular:portCellular;transport=tls>
From: "userB display"<sip userB@ipPBX;transport=tls>;tag=snl_5nM17ycr5u
Call-ID
CSeq:
Session-Expires:
Min-SE: 1800
Accept-Language: en;q=0.0
Alert-Info: <info=alert-autoanswer;
Allow:
Content-Type: application/sdp
Date:
Supported: timer 10) In the case that the IP PBX 4 and the SIP client 3 support Auto-answer functionality, the SIP client 3 auto-answers the call and the speech path is restored.

SIP/2.0 200 OK
Via:
From: <sip:userB@ipPBX;transport=tls>
To: <sip:userA@ipCellularportCellular;transport=tls>; tag= . . . ;epid=sc1913Eg
Call-ID:
CSeq:
Allow:
Allow-Events:
Contact: <sip:userA@ipCellular:portCellular; transport=tls>;
Server:
Supported:
Content-Disposition:
Content-Type:
Content-Length:

If the Auto-Answer functionality is not supported, then SIP 180 ringing is sent from the SIP client 3 to the PBX 4 and the user has to manually answer the call. After the manual answering of the call, SIP 200 OK is sent to the PBX 4.

The solution can be applied to SIP clients (as the first mobile client 3) that use the refresh registration mechanism or the registration mechanism that is used for support of the push notification concept. The refresh registration concept foresees that every x minutes the SIP client 3 re-registers with the IP PBX 4. This might set a limitation in the Auto-Handover flow in the case that the switching over of the networks takes place in a period of less than 10 seconds before the registration timeout expires.

As to the registration concept for push notification support, it is noted that the refresh registration concept that was described above may not be applied for applications that use push notification. It is either restricted or not desirable due to high battery consumption. Thus, the registration timeout for SIP clients has a high value and the registration is refreshed every time the application is moving from the background to the foreground. This way, the flow of the Auto-Handover is never influenced by the registration renewal.

As an alternative embodiment, mobile devices providing for simultaneous access to several suitable wireless networks, the operating system informs the SIP client 3 as soon as a connectivity is given via another wireless network access device in order to trigger the registration with the PBX 4 with another unique endpoint ID according to one or more embodiments of the invention. This may even shorten the time for switch-over as the registration step has already been performed.

REFERENCE NUMERALS

1 mobile communication system
2 first mobile device
3 first mobile client
4 IP- or SIP-based PBX
5 second mobile device
6 first communication network (Wi-Fi or Mobile Cellular/LTE)
7 second communication network (Wi-Fi or Mobile Cellular/LTE)

The invention claimed is:
1. A method for handing over a call from a first communication network to a second communication network, wherein the method comprises:
  registering, by a first mobile client comprising an IP-PBX VoIP client, running on a mobile device connected via the first communication network with an IP-based

PBX, by sending a registration message from the first mobile client to the IP-based PBX, the registration message comprising a first endpoint ID associated with the mobile device and the first communication network;

establishing a call over the first communication network;

detecting, on the mobile device, a connectivity via the second communication network;

registering, by the mobile device, a second endpoint ID associated with the mobile device and the second communication network;

detecting, on the mobile device, a service degradation of a transmission over the first communication network;

retrieving, by the first mobile client, a status of the call impacted by the service degradation using third party call control at the IP-based PBX; and, subsequently initiating, by the first mobile client, a request to transfer the call using said third party call control at the IP-based PBX to the second endpoint ID;

wherein the first mobile client compares a unique identifier part of an SIP endpoint ID of the call to a first registered unique identifier part; and, when the unique identifier part of the SIP endpoint ID of the call matches the first registered unique identifier part the first mobile client sends a CSTA "SingleStep-Transfer" to the IP-based PBX to transfer the call from the first communication network to the second communication network using the second endpoint ID.

2. The method according to claim 1, further comprising generating one or more endpoint IDs, wherein each endpoint ID of said one or more endpoint IDs comprises
said unique identifier part; and
a network identifier part comprising 1 digit.

3. The method according to claim 2, wherein the generating one or more endpoint IDs comprises generating the first endpoint ID and generating the second endpoint ID.

4. The method according to claim 3, wherein the network identifier part of the first endpoint ID is different from the network identifier part of the second endpoint ID.

5. The method according to claim 1, wherein the first endpoint ID is included in a "from" header of the registration message.

6. The method according to claim 1, wherein the detecting, on the mobile device, the service degradation is performed by one or both of
an operating system of the mobile device, which conveys information on a network connectivity change to the first mobile client; and,
the first mobile client.

7. The method according to claim 1, wherein an operating system of the mobile device detects the connectivity via the second communication network and transmits information on the connectivity via the second communication network to the first mobile client.

8. The method according to claim 1, wherein the first mobile client queries for an active call on the mobile device using CSTA-messages "Snapshot_Device" and "Snapshot_Call requests".

9. The method according to claim 8, wherein the first mobile client receives a CSTA Snapshot_Call response" containing the active call.

10. The method according to claim 1, wherein a SIP: INVITE message using the second endpoint ID is sent via the second communication network with an Auto-Answer flag set, so that a call handover from the first communication network to the second communication network is automatically accepted by a transferred-to endpoint.

11. The method according to claim 1, wherein the IP-based PBX is capable of third-party call control.

12. The method according claim 1, wherein the first mobile client is a VoIP client.

13. The method according to claim 1, wherein the IP-based PBX is a SIP-based PBX.

14. The method according to claim 1, wherein the first mobile client is a SIP client.

15. The method according to claim 1, wherein CSTA messages are conveyed over SIP signaling messages.

16. The method according to claim 1, wherein the mobile device on which the first mobile client is running, and the IP-based PBX are configured in an OpenScape Voice Enterprise communication system.

* * * * *